United States Patent

Ikebata et al.

(10) Patent No.: US 10,864,901 B2
(45) Date of Patent: Dec. 15, 2020

(54) VEHICLE TRAVEL CONTROL SYSTEM

(71) Applicant: TOYOTA JIDOSHA KABUSHIKI KAISHA, Toyota (JP)

(72) Inventors: Yusuke Ikebata, Susono (JP); Shinpei Kokubo, Sumida-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 16/253,418

(22) Filed: Jan. 22, 2019

(65) Prior Publication Data

US 2019/0283729 A1 Sep. 19, 2019

(30) Foreign Application Priority Data

Mar. 19, 2018 (JP) .................. 2018-051064

(51) Int. Cl.
*B60R 16/02* (2006.01)
*B60S 1/48* (2006.01)
*B60S 1/56* (2006.01)
*B60S 1/66* (2006.01)
*B60W 10/184* (2012.01)
*B60W 10/20* (2006.01)
(Continued)

(52) U.S. Cl.
CPC .......... *B60W 10/20* (2013.01); *B60W 30/09* (2013.01); *B60W 30/12* (2013.01); *G08G 1/166* (2013.01); *B60W 10/184* (2013.01); *B60W 50/14* (2013.01)

(58) Field of Classification Search
CPC ...... B60W 10/20; B60W 30/12; B60W 30/09; B60W 10/184; B60W 50/14; B60W 2556/50; B60W 50/023; B60R 16/02; B60S 1/486; B60S 1/56; B60S 1/66; G08G 1/166
USPC .......................................................... 701/41
See application file for complete search history.

(56) References Cited

U.S. PATENT DOCUMENTS

2004/0221878 A1* 11/2004 Johnson .................... B60S 3/04
134/56 R
2014/0104622 A1* 4/2014 Geminiani ................ B60S 3/04
356/612
(Continued)

FOREIGN PATENT DOCUMENTS

JP 2014-013454 A 1/2014
WO 2014/007153 A1 1/2014
WO WO-2019022038 A1 * 1/2019 ................ B60S 1/60

*Primary Examiner* — Behrang Badii
*Assistant Examiner* — Hossam M Abd El Latif
(74) *Attorney, Agent, or Firm* — Sughrue Mion, PLLC

(57) ABSTRACT

A vehicle travel control system installed on a vehicle includes: a recognition sensor configured to recognize a situation around the vehicle; a sensor cleaning device configured to clean the recognition sensor; and a control device configured to execute vehicle travel control based on result of recognition by the recognition sensor, and to actuate the sensor cleaning device to execute sensor cleaning processing that cleans the recognition sensor. The control device permits execution of the sensor cleaning processing in a situation where decrease in recognition performance has a small influence on the vehicle travel control. For example, when a surrounding vehicle recognized by a first recognition sensor is also recognized by a second recognition sensor, the control device permits execution of the sensor cleaning processing that cleans the first recognition sensor.

4 Claims, 9 Drawing Sheets

(51) Int. Cl.
*B60W 30/09* (2012.01)
*B60W 30/12* (2020.01)
*B60W 50/023* (2012.01)
*B60W 50/14* (2020.01)
*G08G 1/16* (2006.01)

(56) References Cited

U.S. PATENT DOCUMENTS

| | | | |
|---|---|---|---|
| 2015/0172582 A1 | 6/2015 | Kiyohara et al. | |
| 2015/0306959 A1* | 10/2015 | Koch | H03K 17/962 701/36 |
| 2018/0143298 A1* | 5/2018 | Newman | G06Q 30/0269 |
| 2019/0047493 A1* | 2/2019 | Chierichetti | B60R 16/0234 |

\* cited by examiner

<EXAMPLES OF CLEANING PERMISSION CONDITION>

| |
|---|
| <FIRST EXAMPLE><br>ANOTHER RECOGNITION SENSOR DIFFERENT FROM<br>SUBJECT OF CLEANING IS EFFECTIVELY IN OPERATION |
| <SECOND EXAMPLE><br>THERE IS LESS ROAD SECTION<br>INVISIBLE FROM RECOGNITION SENSOR |
| <THIRD EXAMPLE><br>VEHICLE IS TRAVELING IN SECTION<br>WHERE STEERING CONTROL IS NOT PLANNED |
| <FOURTH EXAMPLE><br>VEHICLE TRAVEL CONTROL IS OFF |
| <FIFTH EXAMPLE><br>VEHICLE IS IN STOP STATE |

*Fig. 2*

VEHICLE TRAVEL CONTROL SYSTEM

BACKGROUND

Technical Field

The present disclosure relates to a vehicle travel control system installed on a vehicle. In particular, the present disclosure relates to a vehicle travel control system that executes vehicle travel control based on result of recognition by a recognition sensor.

Background Art

Patent Literature 1 discloses an environment recognition device installed on a vehicle. The environment recognition device is provided with a camera for recognizing environment, a state determination unit that determines a lens dirty condition of the camera, and an app control unit that controls a recognition application. The app control unit determines, based on the lens dirty condition, whether execution of the recognition application is possible or not. Furthermore, the app control unit controls removal of dirt of the lens based on the lens dirty condition.

Patent Literature 2 discloses a method of cleaning a lens of a camera installed on a vehicle. According to the method, a lens dirty condition is recorded when an engine is in a stop state. When the engine is started, the recorded lens dirty condition is read out as an initial value. After the engine is started, a cleaning device for cleaning the lens is activated if the lens dirty condition is increased from the initial value by more than a certain level.

LIST OF RELATED ART

Patent Literature 1: Japanese Unexamined Patent Application Publication No. JP-2014-13454
Patent Literature 2: International Publication WO 2014/007153

SUMMARY

In order to execute vehicle travel control based on a situation around a vehicle, a recognition sensor for recognizing the situation is necessary. The vehicle travel control is executed based on result of recognition by the recognition sensor. Therefore, maintaining recognition performance of the recognition sensor is important in executing the vehicle travel control.

Here, let us consider a case where cleaning of the recognition sensor is performed. For example, when dirt or water drop on a sensor surface of the recognition sensor is detected, cleaning of the recognition sensor is performed. During cleaning of the recognition sensor, the recognition performance is decreased because cleaning solution is applied to the sensor surface. Moreover, even after the cleaning is completed, the recognition performance does not recover until the cleaning solution dries. That is, the recognition performance is temporarily decreased with the cleaning of the recognition sensor. Accuracy of the vehicle travel control is possibly decreased during a period when the recognition performance of the recognition sensor is decreased. Thus, it may be necessary to temporarily limit the vehicle travel control. Limiting the vehicle travel control every time the cleaning of the recognition sensor is performed causes decrease in convenience.

Influence of the decrease in the recognition performance accompanied by the cleaning of the recognition sensor is not considered in the above-mentioned Patent Literature 1 and Patent Literature 2.

An object of the present disclosure is to provide a technique that can suppress influence of cleaning of a recognition sensor on vehicle travel control.

A first disclosure is directed to a vehicle travel control system installed on a vehicle.

The vehicle travel control system includes:

a recognition sensor configured to recognize a situation around the vehicle;

a sensor cleaning device configured to clean the recognition sensor; and a control device configured to execute vehicle travel control based on result of recognition by the recognition sensor, and to actuate the sensor cleaning device to execute sensor cleaning processing that cleans the recognition sensor.

The recognition sensor includes a first recognition sensor and a second recognition sensor.

When a surrounding vehicle recognized by the first recognition sensor is also recognized by the second recognition sensor, the control device permits execution of the sensor cleaning processing that cleans the first recognition sensor.

A second disclosure is directed to a vehicle travel control system installed on a vehicle.

The vehicle travel control system includes:

a recognition sensor configured to recognize a situation around the vehicle;

a sensor cleaning device configured to clean the recognition sensor;

a control device configured to execute vehicle travel control based on result of recognition by the recognition sensor, and to actuate the sensor cleaning device to execute sensor cleaning processing that cleans the recognition sensor; and a map database.

A recognized road shape is a road shape that is in a recognition area around the vehicle and recognized by the recognition sensor.

A registered road shape is another road shape that is in the recognition area and registered in the map database.

When degree of coincidence between the recognized road shape and the registered road shape is equal to or higher than a threshold, the control device permits execution of the sensor cleaning processing.

A third disclosure is directed to a vehicle travel control system installed on a vehicle.

The vehicle travel control system includes:

a recognition sensor configured to recognize a situation around the vehicle;

a sensor cleaning device configured to clean the recognition sensor; and a control device configured to execute vehicle travel control based on result of recognition by the recognition sensor, and to actuate the sensor cleaning device to execute sensor cleaning processing that cleans the recognition sensor.

The control device creates a vehicle travel plan and executes the vehicle travel control in accordance with the vehicle travel plan.

The vehicle travel control includes steering control.

The control device refers to the vehicle travel plan to permit execution of the sensor cleaning processing in a section where the steering control is not planned.

A fourth disclosure is directed to a vehicle travel control system installed on a vehicle.

The vehicle travel control system includes:

a recognition sensor configured to recognize a situation around the vehicle;

a sensor cleaning device configured to clean the recognition sensor; and a control device configured to execute vehicle travel control based on result of recognition by the recognition sensor, and to actuate the sensor cleaning device to execute sensor cleaning processing that cleans the recognition sensor.

The control device creates a vehicle travel plan and executes the vehicle travel control in accordance with the vehicle travel plan.

The control device refers to the vehicle travel plan to determine whether or not a remaining time before end of the vehicle travel control is less than a predetermined value.

When the remaining time is less than the predetermined value, the control device executes the sensor cleaning processing after the end of the vehicle travel control.

The vehicle travel control system according to the present disclosure executes the vehicle travel control based on the result of recognition by the recognition sensor. Moreover, the vehicle travel control system executes the sensor cleaning processing that cleans the recognition sensor. The sensor cleaning processing is permitted in a situation where decrease in the recognition performance has a small influence on the vehicle travel control. That is, influence of the sensor cleaning processing on the vehicle travel control is suppressed. It is therefore possible to execute the sensor cleaning processing without limiting the vehicle travel control. Since opportunity to limit the vehicle travel control is reduced, the convenience is improved.

BRIEF DESCRIPTION OF DRAWINGS

FIG. 2 is a diagram summarizing various examples of a cleaning permission condition in the embodiment of the present disclosure;

EMBODIMENTS

Embodiments of the present disclosure will be described below with reference to the attached drawings.

1. Outline

Figure 1:
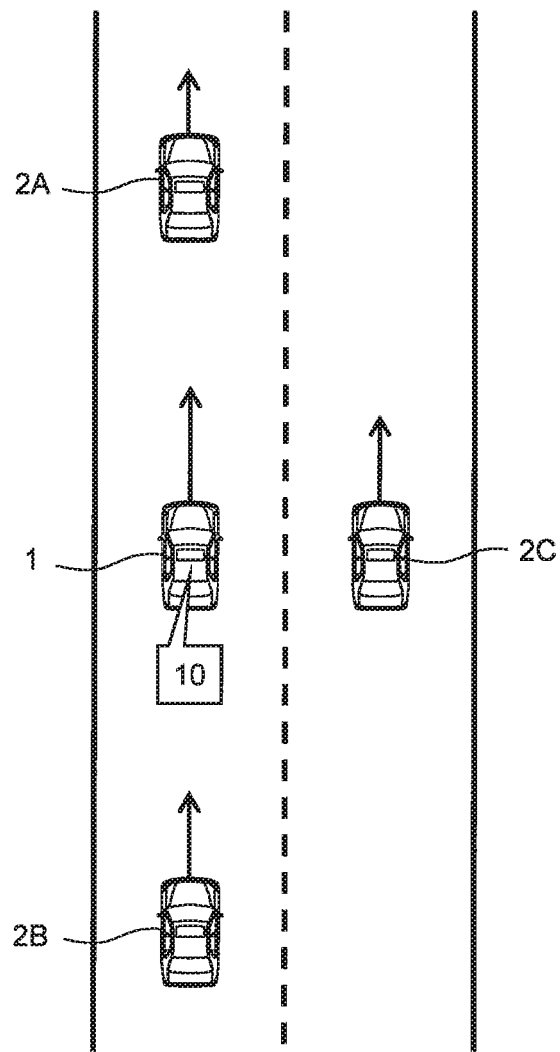
FIG. 1 is a conceptual diagram for explaining an outline of a vehicle travel control system according to an embodiment of the present disclosure.

FIG. 1 is a conceptual diagram for explaining an outline of a vehicle travel control system 10 according to the present embodiment. The vehicle travel control system 10 is installed on a vehicle 1 and executes "vehicle travel control" that controls travel of the vehicle 1. The vehicle travel control is concept including autonomous driving control and driving support control. The driving support control is exemplified by adaptive cruise control (ACC), lane tracing assist (LTA), lane change assist (LCA), and so forth.

The vehicle travel control is executed based on a situation around vehicle 1. To that end, the vehicle travel control system 10 is provided with a recognition sensor for recognizing the situation around the vehicle 1. The vehicle travel control system 10 executes the vehicle travel control based on result of recognition by the recognition sensor.

For example, a surrounding vehicle 2 around the vehicle 1 is recognized as a target by the recognition sensor. In FIG. 1, a preceding vehicle 2A, a following vehicle 2B, and an adjacent vehicle 2C are shown as examples. The vehicle travel control system 10 refers to a situation of the recognized surrounding vehicles 2 to execute the vehicle travel control (e.g. acceleration control, deceleration control, steering control). For example, the vehicle travel control system 10 executes the vehicle travel control such that the vehicle 1 follows the recognized preceding vehicle 2A. As another example, the vehicle travel control system 10 refers to the situation of the recognized surrounding vehicles 2 to make a lane change at a safe timing.

Here, let us consider a case where cleaning of the recognition sensor is performed. For example, when dirt or water drop on a sensor surface of the recognition sensor is detected, cleaning of the recognition sensor is performed. During cleaning of the recognition sensor, recognition performance is decreased because cleaning solution is applied to the sensor surface. Moreover, even after the cleaning is completed, the recognition performance does not recover until the cleaning solution dries. That is, the recognition performance is temporarily decreased with the cleaning of the recognition sensor. Accuracy of the vehicle travel control is possibly decreased during a period when the recognition performance of the recognition sensor is decreased. Thus, it may be necessary to temporarily limit the vehicle travel control. Limiting the vehicle travel control every time the cleaning of the recognition sensor is performed causes decrease in convenience.

In view of the above, according to the present embodiment, a timing of the cleaning of the recognition sensor is determined in consideration of influence on the vehicle travel control. More specifically, the cleaning of the recognition sensor is permitted in a situation where there is no need to limit the vehicle travel control even if the recognition performance is decreased. In other words, the cleaning of the recognition sensor is permitted in a situation where decrease in the recognition performance has a small influence on the vehicle travel control.

FIG. 2 summarizes various examples of a "cleaning permission condition" in the present embodiment. The cleaning permission condition is a condition for permitting execution of "sensor cleaning processing" that cleans the recognition sensor. Execution of the sensor cleaning processing is permitted only when the cleaning permission condition is satisfied. When the cleaning permission condition is not satisfied, execution of the sensor cleaning processing is prohibited.

As a first example, execution of the sensor cleaning processing is permitted when another recognition sensor different from the recognition sensor being a subject of cleaning is effectively in operation. During cleaning of the recognition sensor being the subject of cleaning, another recognition sensor effectively operates and thus the recognition performance is hardly decreased. That is, the influence of the sensor cleaning processing on the vehicle travel control is small and thus there is no need to limit the vehicle travel control.

As a second example, execution of the sensor cleaning processing is permitted when there is less road section invisible from the recognition sensor. As a comparative example, let us consider a case where there is much road section invisible from the recognition sensor. For instance, when a curved road or a longitudinal slope exists ahead of the vehicle 1, there is much road section invisible from a front recognition sensor. In this case, an unrecognized target (e.g. a surrounding vehicle 2, an obstacle, and the like) may exist in the invisible road section. In such a situation, it is desirable to maintain recognition ability without executing the sensor cleaning processing. On the other hand, when there is less road section invisible from the recognition sensor, an unrecognized target is unlikely to newly appear. Therefore, even when the recognition performance is temporarily decreased, its influence on the vehicle travel control is small and thus there is no need to limit the vehicle travel control.

As a third example, execution of the sensor cleaning processing is permitted when the vehicle 1 is traveling in a section where the steering control is not planned. The steering control is generally executed in such situations as traveling in a curved road, making a lane change, and the like. Decrease in the recognition performance is not preferable in such the situation where the steering control is executed. On the other hand, in a section where the steering control is not planned, even when the recognition performance is temporarily decreased, its influence on the vehicle travel control is small.

As a fourth example, execution of the sensor cleaning processing is permitted when the vehicle travel control is OFF. When the vehicle travel control by the vehicle travel control system 10 is in the OFF state, a driver performs manual driving. Therefore, no problem is caused even when the recognition performance is temporarily decreased due to the sensor cleaning processing. When there is less remaining time before end of the vehicle travel control, it may be considered to postpone execution of the sensor cleaning processing until the end of the vehicle travel control.

As a fifth example, execution of the sensor cleaning processing is permitted when the vehicle 1 is in a stop state. When the vehicle 1 is in the stop state, need for recognition is much lower as compared with a case where the vehicle 1 is moving. Therefore, even when the recognition performance is temporarily decreased, its influence on the vehicle travel control is small and thus there is no need to limit the vehicle travel control.

It is also possible to use a combination of some of the first to fifth examples as the cleaning permission condition.

As described above, the vehicle travel control system 10 according to the present embodiment executes the vehicle travel control based on the result of recognition by the recognition sensor. Moreover, the vehicle travel control system 10 executes the sensor cleaning processing that cleans the recognition sensor. The sensor cleaning processing is permitted in a situation where decrease in the recognition performance has a small influence on the vehicle travel control. That is, the influence of the sensor cleaning processing on the vehicle travel control is suppressed. It is therefore possible to execute the sensor cleaning processing without limiting the vehicle travel control. Since opportunity to limit the vehicle travel control is reduced, the convenience is improved.

Hereinafter, the vehicle travel control system 10 according to the present embodiment will be described in more detail.

2. Vehicle Travel Control System 2-1. Configuration Example

Figure 3:
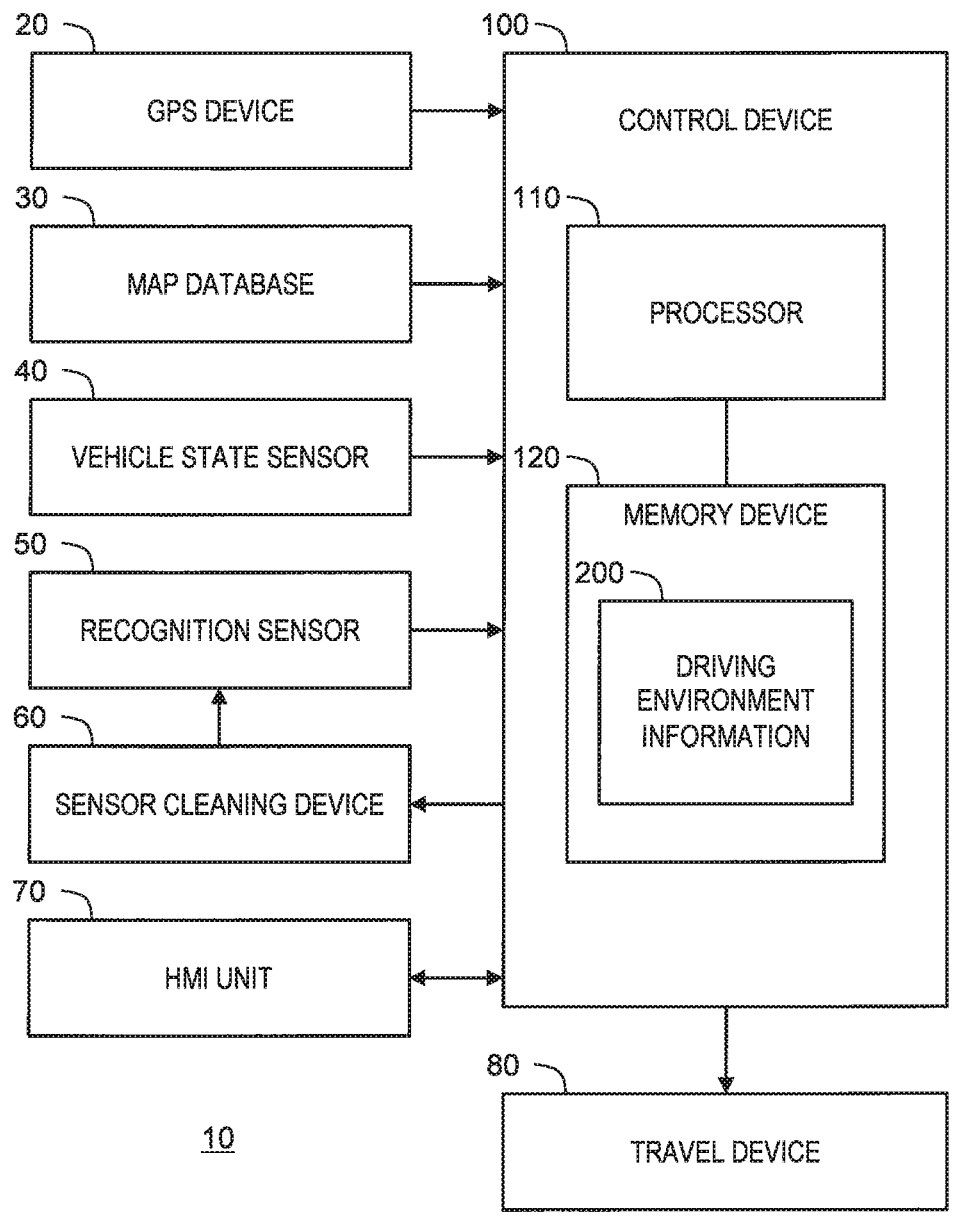
FIG. 3 is a block diagram showing a configuration example of the vehicle travel control system according to the embodiment of the present disclosure.

FIG. 3 is a block diagram showing a configuration example of the vehicle travel control system 10 according to the present embodiment. The vehicle travel control system 10 is provided with a GPS (Global Positioning System) device 20, a map database 30, a vehicle state sensor 40, a recognition sensor 50, a sensor cleaning device (sensor cleaner) 60, an HMI (Human Machine Interface) unit 70, a travel device 80, and a control device (controller) 100.

The GPS device 20 receives signals transmitted from a plurality of GPS satellites and calculates a position and an orientation of the vehicle 1 based on the received signals.

Map information is recorded in the map database 30. The map information includes information of 3-dimensional road shapes, lane geometries, lane attributes, and the like. The map database 30 is achieved by a memory device.

The vehicle state sensor 40 detects a state of the vehicle 1. For example, the vehicle state sensor 40 includes a wheel speed sensor, a vehicle speed sensor, and so forth. The wheel speed sensor detects a rotational speed of each wheel of the vehicle 1. The vehicle speed sensor detects a speed of the vehicle 1.

The recognition sensor 50 recognizes a situation around the vehicle 1. The recognition sensor 50 is exemplified by a LIDAR (Laser Imaging Detection and Ranging), a radar, a camera (imaging device), and so forth. The LIDAR uses laser lights to detect a target around the vehicle 1. The radar uses radio waves to detect a target around the vehicle 1. The camera images a situation around the vehicle 1. Installation positions and the number of recognition sensors 50 are not limited in particular. For example, the recognition sensors 50 are installed on a front surface, a side surface, and a rear surface of the vehicle 1.

The sensor cleaning device (sensor cleaner) 60 cleans the recognition sensor 50. For example, the sensor cleaning device 60 sprays cleaning solution on a sensor surface of the recognition sensor 50 to clean the sensor surface.

The HMI unit 70 is an interface for proving a driver with information and receiving information from the driver. More specifically, the HMI unit 70 includes an input device and an output device. The input device is exemplified by a touch panel, a switch, a microphone, and the like. The output device is exemplified by a display device, a speaker, and the like.

The travel device 80 includes a steering device, a driving device, and a braking device. The steering device turns wheels. The driving device is a power source that generates a driving force. The driving device is exemplified by an engine and an electric motor. The braking device generates a braking force.

The control device (controller) 100 is a microcomputer including a processor 110 and a memory device 120. The control device 100 is also called an ECU (Electronic Control Unit). Processing by the control device 100 is achieved by the processor 110 executing a control program stored in the memory device 120. Hereinafter, the processing by the control device 100 will be described.

2-2. Information Acquisition Processing

The control device 100 executes information acquisition processing that acquires information necessary for the vehicle travel control. The information necessary for the vehicle travel control is information indicating driving environment for the vehicle 1, and the information is hereinafter referred to as "driving environment information 200". The driving environment information 200 is stored in the memory device 120, and read out and used as appropriate.

Figure 4:
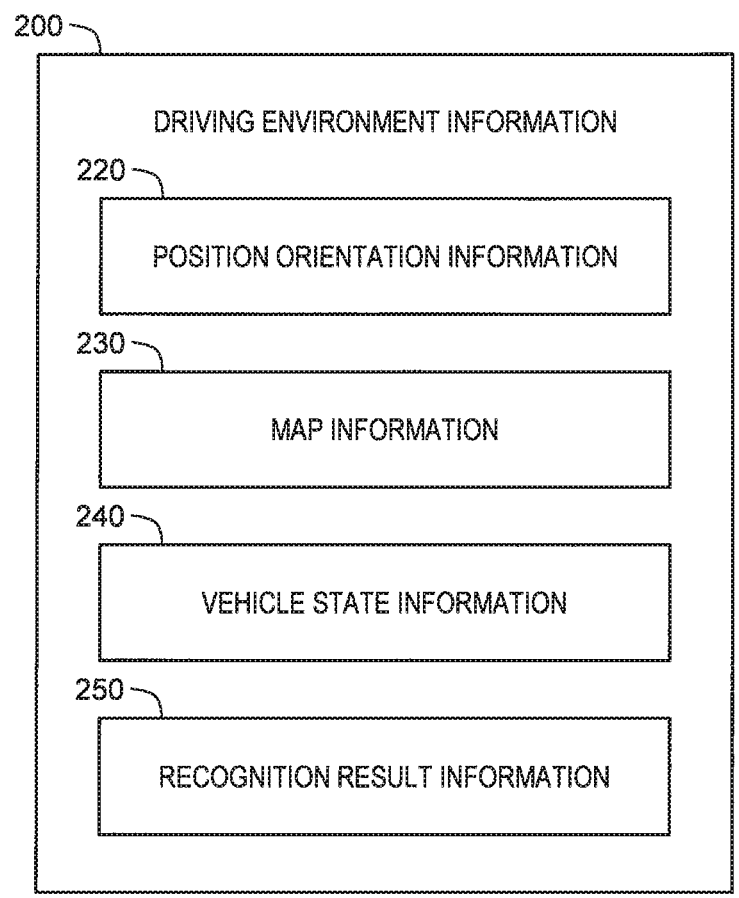
FIG. 4 is a block diagram showing an example of driving environment information used in the vehicle travel control system according to the embodiment of the present disclosure.

FIG. 4 shows an example of the driving environment information 200 in the present embodiment. The driving environment information 200 includes position orientation information 220, map information 230, vehicle state information 240, and recognition result information 250.

The position orientation information 220 indicates the position and the orientation of the vehicle 1. The control device 100 acquires the position orientation information 220 from the GPS device 20.

The map information 230 includes information of 3-dimensional road shapes, lane geometries, lane attributes, and the like. The control device 100 acquires the map information 230 regarding a desired area based on the position orientation information 220 and the map database 30.

The vehicle state information 240 is information detected by the vehicle state sensor 40. For example, the vehicle state information 240 includes vehicle speed information indicating the speed of the vehicle 1.

The recognition result information 250 is information recognized by the recognition sensor 50. The recognition result information 250 includes target information regarding a target around the vehicle 1. The target around the vehicle 1 is exemplified by the surrounding vehicle 2, a white line, a roadside structure, a sign, and so forth. The target information includes a relative position, a relative speed, and the like of the detected target as seen from the vehicle 1.

It can be said that the GPS device 20, the map database 30, the vehicle state sensor 40, the recognition sensor 50, and the control device 100 constitute an "information acquisition device" that acquires the driving environment information 200.

2-3. Vehicle Travel Control

The control device 100 executes the vehicle travel control based on the driving environment information 200. More specifically, the control device 100 creates a vehicle travel plan being a plan of the vehicle travel control based on the driving environment information 200. The vehicle travel plan includes a travel route to a destination, a local target path (target trajectory), and so forth.

Then, the control device 100 executes the vehicle travel control in accordance with the vehicle travel plan. The vehicle travel control includes steering control, acceleration control, and deceleration control. The control device 100 executes the steering control by appropriately actuating the steering device. Moreover, the control device 100 executes the acceleration control and the deceleration control by appropriately actuating the driving device and the braking device. It can be said that the control device 100 and the travel device 80 constitute a "vehicle travel control device" that executes the vehicle travel control based on the driving environment information 200.

In particular, the control device 100 (the vehicle travel control device) executes the vehicle travel control based on the recognition result information 250. For example, the control device 100 executes the vehicle travel control such that the vehicle 1 follows the preceding vehicle 2A recognized by the recognition sensor 50. As another example, the control device 100 makes a lane change at a safe timing in consideration of a situation of the surrounding vehicle 2 recognized by the recognition sensor 50. Therefore, maintaining recognition performance of the recognition sensor 50 is important in executing the vehicle travel control.

2-4. Sensor Cleaning Processing

The control device 100 executes the sensor cleaning processing that cleans the recognition sensor 50. More specifically, the control device 100 executes the sensor cleaning processing by actuating the sensor cleaning device 60. It can be said that the control device 100 and the sensor cleaning device 60 constitute a "sensor cleaning device" that executes the sensor cleaning processing.

Figure 5:
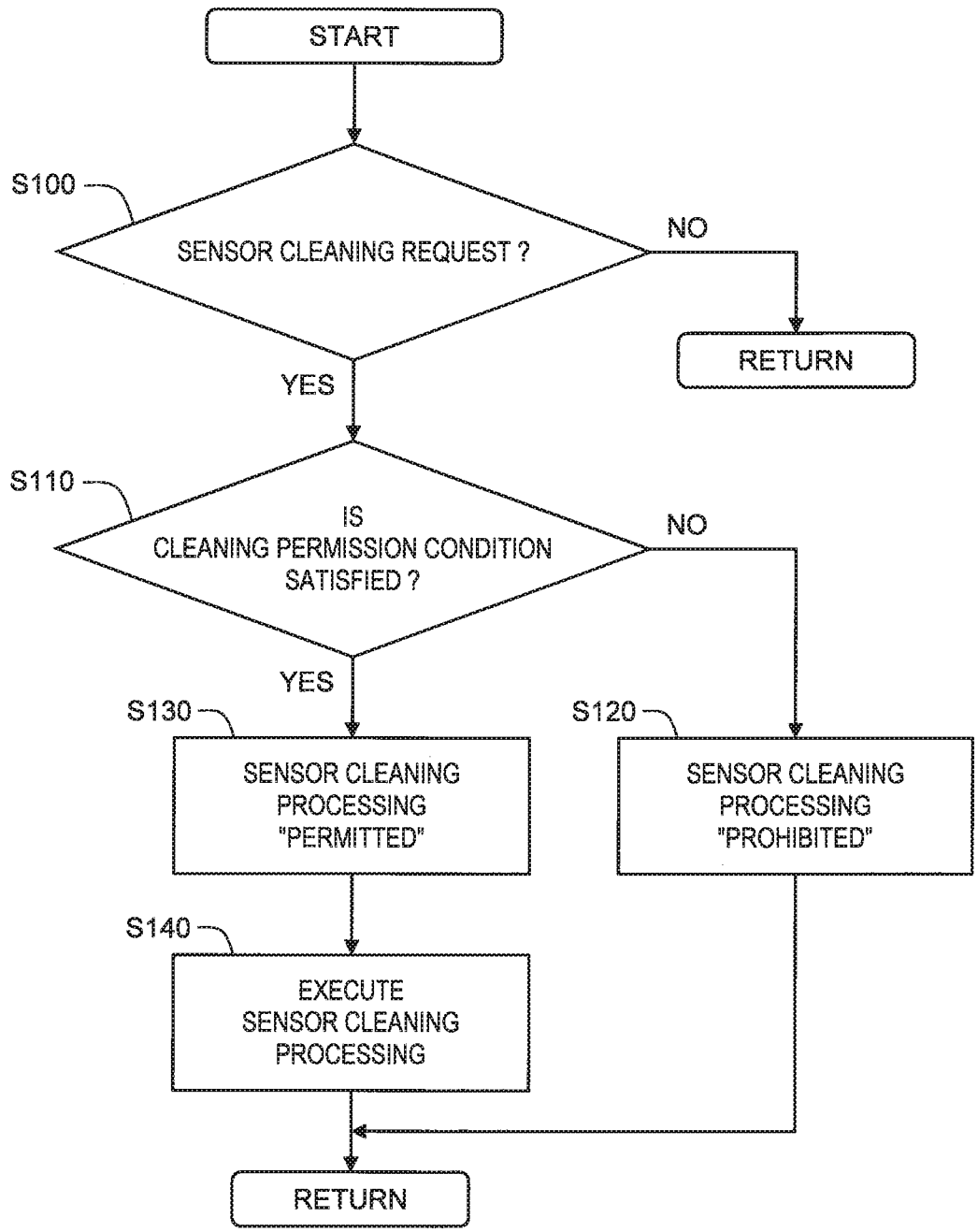
FIG. 5 is a flow chart for explaining sensor cleaning processing according to the embodiment of the present disclosure.

FIG. 5 is a flow chart for explaining the sensor cleaning processing according to the present embodiment. The process flow shown in FIG. 5 is repeatedly executed every certain cycle.

In Step S100, the control device 100 determines whether or not there is a "sensor cleaning request". The sensor cleaning request is a request for execution of the sensor cleaning processing. Typically, when dirt or water drop on a sensor surface of the recognition sensor 50 is detected, the sensor cleaning request is issued. As another example, the sensor cleaning request may be issued at a time of activation of the vehicle travel control system 10.

Various methods for detecting dirt or water drop on the sensor surface of the recognition sensor 50 have been proposed. The method is not limited in particular in the present embodiment. For example, a sensor for monitoring the sensor surface is provided separately.

When there is no sensor cleaning request (Step S100; No), the processing in the current cycle ends. On the other hand, where there is the sensor cleaning request (Step S100; Yes), the processing proceeds to Step S110.

In Step S110, the control device 100 determines whether or not the cleaning permission condition (see FIG. 2) is satisfied. Concrete examples of the cleaning permission condition and concrete determination methods will be described later. When the cleaning permission condition is not satisfied (Step S110; No), the processing proceeds to Step S120. On the other hand, when the cleaning permission condition is satisfied (Step S110; Yes), the processing proceeds to Step S130.

In Step S120, the control device 100 prohibits execution of the sensor cleaning processing. Then, the processing in the current cycle ends.

In Step S130, the control device 100 permits execution of the sensor cleaning processing. After that, the processing proceeds to Step S140.

In Step S140, the control device 100 actuates the sensor cleaning device 60 to execute the sensor cleaning processing. At this time, the control device 100 may use the HMI unit 70 to notify the driver of a fact that "the recognition sensor 50 is being cleaned".

3. Cleaning Permission Condition

According to the present embodiment, the cleaning permission condition is set such that the influence of the sensor cleaning processing on the vehicle travel control is suppressed. Hereinafter, various examples of the cleaning permission condition will be described.

3-1. First Example

Figure 6:
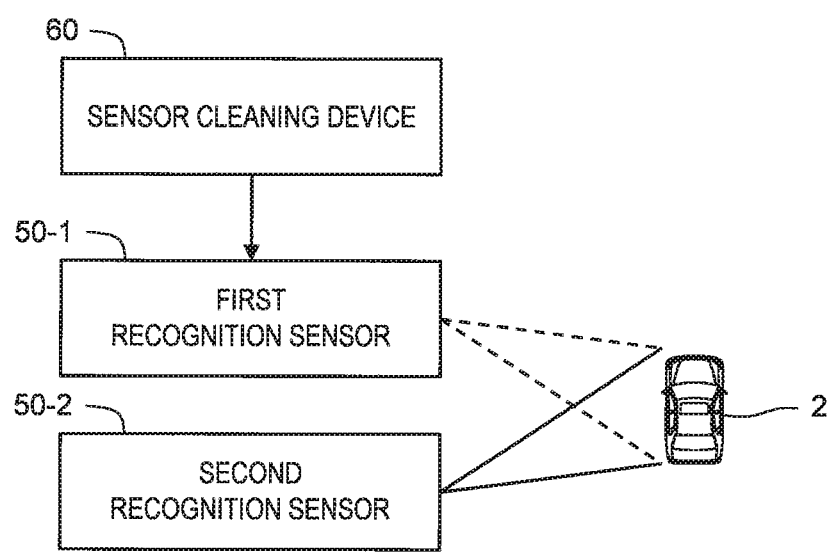
FIG. 6 is a conceptual diagram for explaining a first example of the cleaning permission condition in the embodiment of the present disclosure.

A first example of the cleaning permission condition is applied to a case where there are a plurality of recognition sensors 50. Here, let us consider a case where there are a first recognition sensor 50-1 and a second recognition sensor 50-2 as shown in FIG. 6. Types of the first recognition sensor 50-1 and the second recognition sensor 50-2 may be the same or different from each other.

For instance, the subject of cleaning is the first recognition sensor 50-1. In this case, the first example of the cleaning permission condition is that "the second recognition sensor 50-2 is effectively in operation". Example of a method of determining that the second recognition sensor 50-2 is effectively in operation are as follows.

In FIG. 6, a same surrounding vehicle 2 is recognized by both the first recognition sensor 50-1 and the second recognition sensor 50-2. In other words, the surrounding vehicle 2 recognized by the first recognition sensor 50-1 is also recognized by the second recognition sensor 50-2. In this case, the control device 100 determines that the second recognition sensor 50-2 is effectively in operation, and thus permits execution of the sensor cleaning processing that cleans the first recognition sensor 50-1.

As another example, reliability of the second recognition sensor 50-2 may be checked. When the second recognition sensor 50-2 is a LIDAR, the reliability can be calculated based on reflected light intensity, the number of detected points, and so forth. When the second recognition sensor 50-2 is a camera, the reliability can be calculated based on edge strength between pixels, and so forth. When the reliability is equal or higher than a threshold, it is determined that the second recognition sensor 50-2 is effectively in operation.

According to the first example, as described above, execution of the sensor cleaning processing for cleaning the first recognition sensor 50-1 is permitted when the second recognition sensor 50-2 is effectively in operation. Even when cleaning of the first recognition sensor 50-1 is performed, the recognition performance is hardly decreased because the second recognition sensor 50-2 effectively operates. That is, the influence of the sensor cleaning processing on the vehicle travel control is small and thus there is no need to limit the vehicle travel control.

3-2. Second Example

Figure 7:
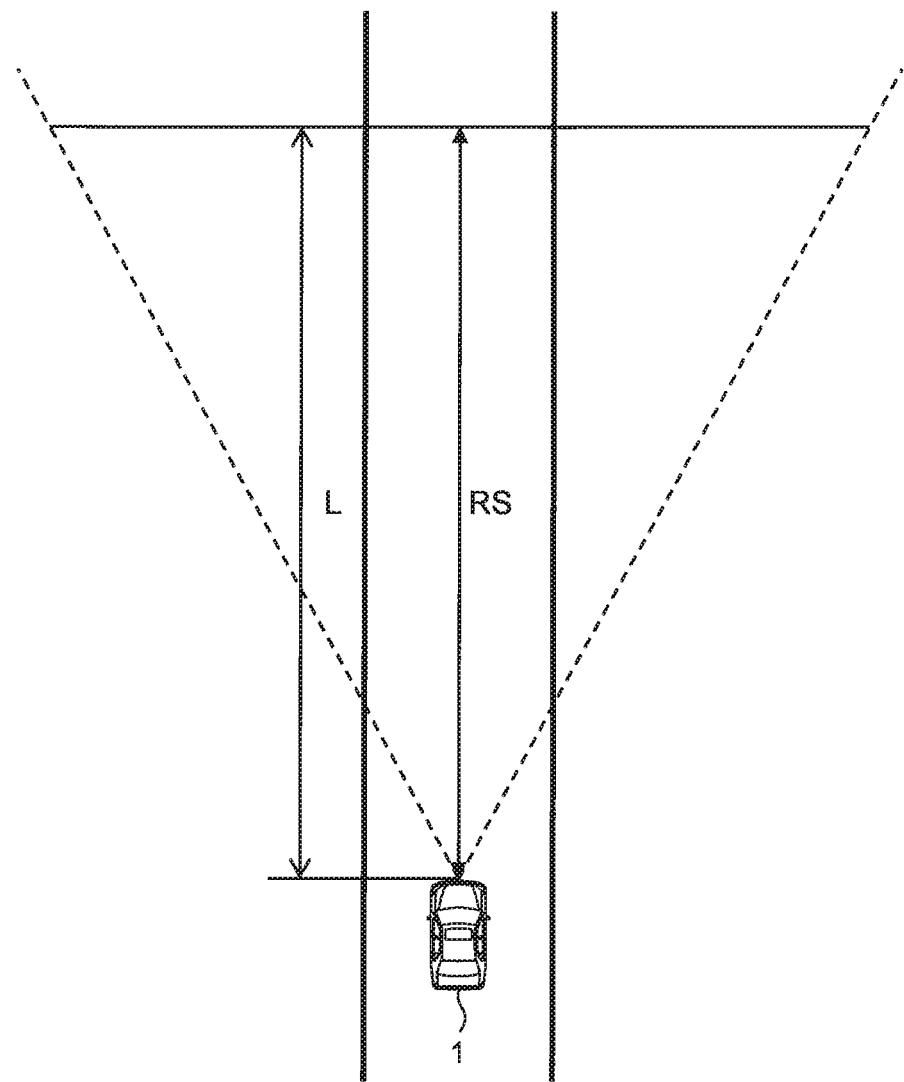
FIG. 7 is a conceptual diagram for explaining a second example of the cleaning permission condition in the embodiment of the present disclosure.
Figure 8:
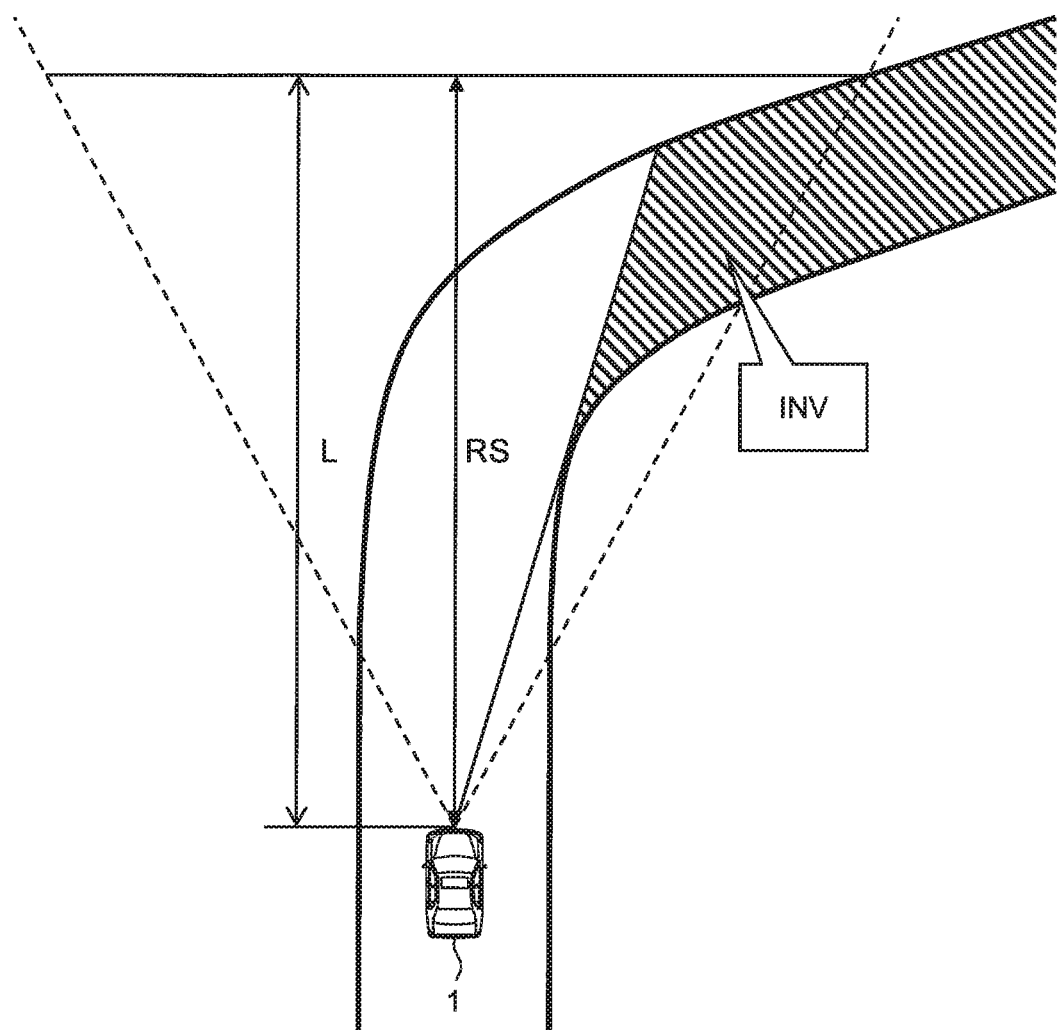
FIG. 8 is a conceptual diagram for explaining the second example of the cleaning permission condition in the embodiment of the present disclosure.

FIGS. 7 and 8 are conceptual diagrams for explaining a second example of the cleaning permission condition. Here, let us consider the recognition sensor 50 that recognizes a situation ahead of the vehicle 1. A recognition area RS is an area with a length L located ahead of the vehicle 1. For example, the length L corresponds to an effective recognition distance of the recognition sensor 50, and the recognition area RS corresponds to an effective recognition range of the recognition sensor 50.

In the example shown in FIG. 7, a road ahead of the vehicle 1 is straight. Therefore, a road in the recognition area RS is well recognized by the recognition sensor 50.

In the example shown in FIG. 8, on the other hand, a curved road exists ahead of the vehicle 1. A part of the road in the recognition area RS cannot be recognized by the recognition sensor 50. That is, in the recognition area RS, there is a road section invisible from the recognition sensor 50. The road section invisible from the recognition sensor 50 in the recognition area RS is hereinafter referred to as an "invisible section INV".

Figure 9:
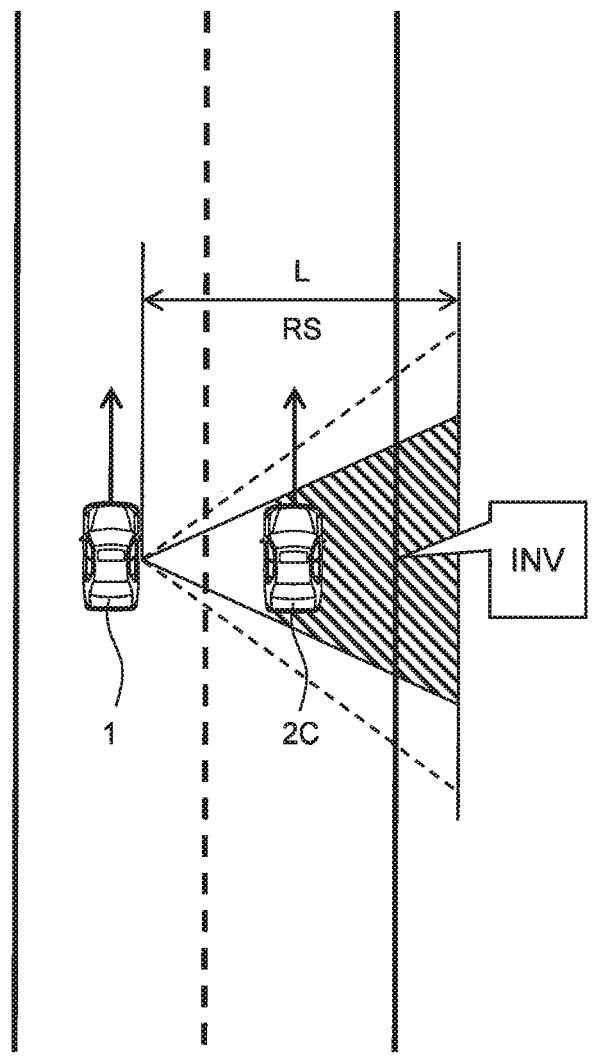
FIG. 9 is a conceptual diagram for explaining the second example of the cleaning permission condition in the embodiment of the present disclosure.

The same applies to a case where a longitudinal slope exists ahead of the vehicle 1, and the invisible section INV may exist in the recognition area RS. Furthermore, the invisible section INV is not limited to an area ahead of the vehicle 1. For example, as shown in FIG. 9, when an adjacent vehicle 2C exists on a side of the vehicle 1, the invisible section INV invisible from a lateral recognition sensor 50 occurs.

When the invisible section INV exists in the recognition area RS around the vehicle 1, an unrecognized target (e.g. the surrounding vehicle 2, an obstacle, and the like) may exist in the invisible section INV. Therefore, when there is much invisible section INV, it is desirable to maintain recognition ability without executing the sensor cleaning processing. On the other hand, when there is less invisible section INV, an unrecognized target is unlikely to newly appear. Therefore, even when the recognition performance is temporarily decreased, its influence on the vehicle travel control is small and thus there is no need to limit the vehicle travel control.

From a view point described above, the second example of the cleaning permission condition is that "there is less invisible section INV invisible from the recognition sensor 50". Examples of a method of determining whether or not there is less invisible section INV are as follows.

The control device 100 makes a comparison between a "recognized road shape FA" and a "registered road shape FB". The recognized road shape FA is a road shape that is in the recognition area RS around the vehicle 1 and recognized by the recognition sensor 50. On the other hand, the registered road shape FB is a road shape that is in the same recognition area RS and registered in the map database 30. The control device 100 acquires the recognized road shape FA based on the recognition result information 250 and acquires the registered road shape FB based on the map information 230.

The road shape in the invisible section INV is missing from the recognized road shape FA. Therefore, as the invisible section INV increases, a difference between the recognized road shape FA and the registered road shape FB becomes larger. Conversely, as the invisible section INV decreases, the difference between the recognized road shape FA and the registered road shape FB becomes smaller.

In view of the above, the control device 100 calculates degree of coincidence between the recognized road shape FA and the registered road shape FB. The degree of coincidence is formulated to be higher as the difference between the recognized road shape FA and the registered road shape FB is smaller and to be lower as the difference is larger. When the degree of coincidence is equal to or higher than a threshold, the control device 100 permits execution of the sensor cleaning processing. It can be said that the second example of the cleaning permission condition is that "the degree of coincidence between the recognized road shape FA and the registered road shape FB is equal to or higher than the threshold".

3-3. Third Example

A third example of the cleaning permission condition is that "the vehicle 1 is traveling in a section where the steering control is not planned". The steering control is generally executed in such situations as traveling in a curved road, making a lane change, and the like. Decrease in the recognition performance is not preferable in such the situation where the steering control is executed. On the other hand, in a section where the steering control is not planned, even when the recognition performance is temporarily decreased, its influence on the vehicle travel control is small.

Whether the steering control is planned or not can be recognized based on the vehicle travel plan for the vehicle travel control. The control device 100 refers to the vehicle travel plan to permit execution of the sensor cleaning processing in a section where the steering control is not planned. For example, when the vehicle 1 is traveling in a single lane straight road, execution of the sensor cleaning processing is permitted because the steering control is not executed.

3-4. Fourth Example

A fourth example of the cleaning permission condition is that "the vehicle travel control is OFF". When the vehicle travel control by the vehicle travel control system 10 is in the OFF state, the driver performs manual driving. Therefore, no problem is caused even when the recognition performance is temporarily decreased due to the sensor cleaning processing.

Moreover, when there is less remaining time before end of the vehicle travel control, execution of the sensor cleaning processing may be postponed until the end of the vehicle travel control. More specifically, the control device 100 refers to the vehicle travel plan to determine whether or not the remaining time before the end of the vehicle travel control is less than a predetermined value. When the remaining time is less than the predetermined value, the control device 100 executes the sensor cleaning processing after the end of the vehicle travel control.

3-5. Fifth Example

A fifth example of the cleaning permission condition is that "the vehicle 1 is in a stop state". The control device 100 can determine whether or not the vehicle 1 is in the stop state based on the vehicle state information 240. When the vehicle 1 is in the stop state, need for recognition is much lower as compared with a case where the vehicle 1 is moving. Therefore, even when the recognition performance is temporarily decreased, its influence on the vehicle travel control is small and thus there is no need to limit the vehicle travel control.

3-6. Sixth Example

In a sixth example, a combination of some of the first to fifth examples described above is used as the cleaning permission condition.

What is claimed is:

1. A vehicle travel control system installed on a vehicle and comprising:
   a recognition sensor configured to recognize a situation around the vehicle;
   a sensor cleaning device configured to clean the recognition sensor; and
   a control device configured to execute vehicle travel control based on result of recognition by the recognition sensor, and to actuate the sensor cleaning device to execute sensor cleaning processing that cleans the recognition sensor, wherein:
   the recognition sensor includes a first recognition sensor and a second recognition sensor;
   a cleaning permission condition with respect to the first recognition sensor is that a surrounding vehicle recognized by the first recognition sensor is also recognized by the second recognition sensor; and
   the control device is further configured to:
   permit execution of the sensor cleaning processing that cleans the first recognition sensor when the cleaning permission condition is satisfied; and
   prohibit the execution of the sensor cleaning processing that cleans the first recognition sensor when the cleaning permission condition is not satisfied.

2. A vehicle travel control system installed on a vehicle and comprising:
   a recognition sensor configured to recognize a situation around the vehicle;
   a sensor cleaning device configured to clean the recognition sensor;
   a control device configured to execute vehicle travel control based on result of recognition by the recognition sensor, and to actuate the sensor cleaning device to execute sensor cleaning processing that cleans the recognition sensor; and
   a map database,
wherein:
   a recognized road shape is a road shape that is in a recognition area around the vehicle and recognized by the recognition sensor;
   a registered road shape is another road shape that is in the recognition area and registered in the map database;
   a cleaning permission condition is that degree of coincidence between the recognized road shape and the registered road shape is equal to or higher than a threshold; and
   the control device is further configured to:
   permit execution of the sensor cleaning processing when the cleaning permission condition is satisfied; and
   prohibit the execution of the sensor cleaning processing when the cleaning permission condition is not satisfied.

3. A vehicle travel control system installed on a vehicle and comprising:
   a recognition sensor configured to recognize a situation around the vehicle;
   a sensor cleaning device configured to clean the recognition sensor; and
   a control device configured to execute vehicle travel control based on result of recognition by the recognition sensor, and to actuate the sensor cleaning device to execute sensor cleaning processing that cleans the recognition sensor,
wherein:
   the control device creates a vehicle travel plan and executes the vehicle travel control in accordance with the vehicle travel plan;
   the vehicle travel control includes steering control;
   a cleaning permission condition is that the vehicle is in a section where the steering control is not planned; and
   the control device is further configured to:
   refer to the vehicle travel plan to determine whether the cleaning permission condition is satisfied;
   permit execution of the sensor cleaning processing when the cleaning permission condition is satisfied; and
   prohibit the execution of the sensor cleaning processing when the cleaning permission condition is not satisfied.

4. The vehicle travel control system according to claim 3, wherein:
- the control device refers to the vehicle travel plan to determine whether or not a remaining time before end of the vehicle travel control is less than a predetermined value; and
- when the remaining time is less than the predetermined value, the control device executes the sensor cleaning processing after the end of the vehicle travel control.

* * * * *